(No Model.)

M. M. SANDERSON.
WHIFFLETREE HOOK.

No. 577,453.  Patented Feb. 23, 1897.

Witnesses
W. L. Seiden.
a. R. Brown.

Inventor
Mark M. Sanderson,
By Chas J. Gooch.
his Attorney

UNITED STATES PATENT OFFICE.

MARK M. SANDERSON, OF ELLSWORTH, WISCONSIN.

WHIFFLETREE-HOOK.

SPECIFICATION forming part of Letters Patent No. 577,453, dated February 23, 1897.

Application filed March 17, 1896. Serial No. 583,520. (No model.)

*To all whom it may concern:*

Be it known that I, MARK M. SANDERSON, a citizen of the United States, residing at Ellsworth, in the county of Pierce and State of Wisconsin, have invented certain new and useful Improvements in Whiffletree-Hooks; and I do hereby declare the following to be a full, clear, and exact description of the invention, such as will enable others skilled in the art to which it appertains to make and use the same.

This invention relates to improvements, as hereinafter set forth, in whiffletree-hooks.

Figure 1:
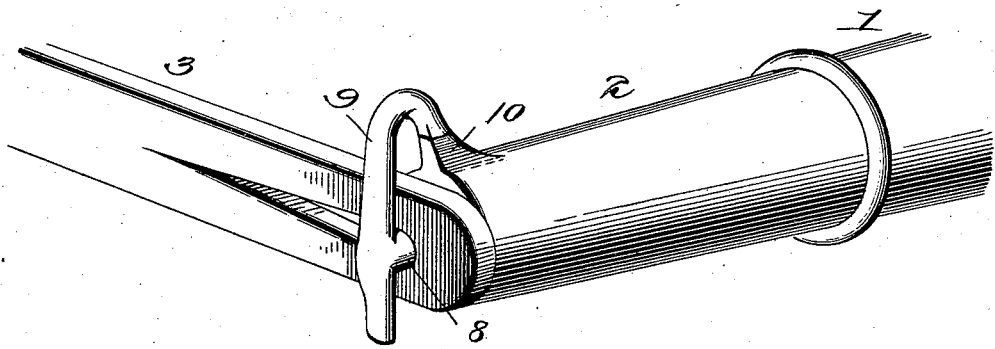
Figure 2:
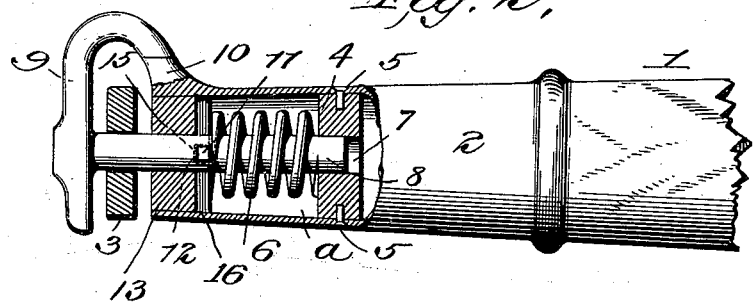
Figure 3:
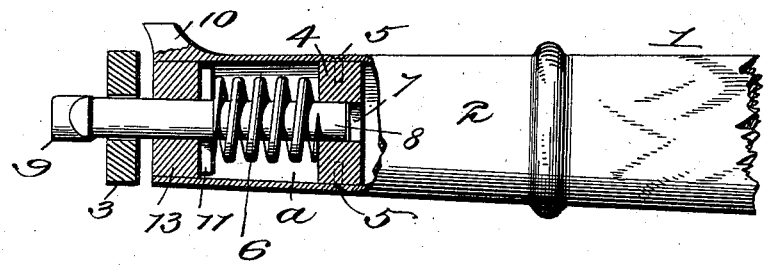
Figure 4:
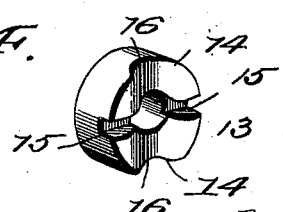

In the drawings, Figure 1 represents a perspective view of a portion of a whiffletree provided with my improved hook and having a trace or tug connected therewith. Fig. 2 represents a longitudinal section of the ferrule with my improved hook and its accessories in position, the hook in this view being shown as closed. Fig. 3 represents a similar view to that shown in Fig. 2, but with the hook open. Fig. 4 represents a perspective view of the pin-locking disk.

1 represents a portion of a whiffletree. 2 is a ferrule mounted on the outer end thereof.

3 represents a trace or tug.

4 is a disk or washer seated within the ferrule a suitable distance inward of its mouth, as shown, and either cast or formed integrally with said ferrule or formed separately therefrom and either screwed thereon or maintained in position by any other suitable means, as by friction or by rivets, screws, pins, or the like, as 5. This disk or washer serves as a seat for the inner end of a spiral spring 6 and is centrally bored, as at 7, to receive with capability of reciprocation and rotation therein the inner end of the hook-pin 8. 9 represents the hook carried by the outer end of said hook-pin, said hook when closed engaging with an arm, lug, or horn 10, extending out laterally from the ferrule, as shown in Fig. 1.

11 represents a square hook-locking pin, which may either be cast integrally with the hook-pin 8 or formed separately therefrom and securely seated transversely within a slot 12 in said hook-pin. This square pin 11 operates, in connection with a square or rectangular groove in the outer disk to be presently described, to lock the hook-pin and hook from rotary or sidewise movement.

The spring 6 is loosely seated within the chamber a, formed by the washer 4 and disk 13, its outer end impinging against the square hook-locking pin 11 to hold the same within its receiving-grooves.

13 represents a centrally-bored disk seated within and filling the mouth of the ferrule. The hook-carrying pin 8 has at its outer portion a reciprocal and rotary guide-bearing within the central bore of the disk 13, whose inner face is rounded or curved, as shown at 14, and is provided with an angular or square transverse groove 15, within which the square locking-pin 11 is immovably seated, so as to lock the hook 9 and pin 8 when said hook is closed, and also a curved transverse groove 16 to receive the hook-locking pin 11 when the hook is opened and maintain said hook in open position while a tug or trace is being either placed in or removed from position. The inner washer or disk 4 also serves as a guide-bearing, as shown, for the inner end of the hook-carrying pin 8.

The washer 4 and the disk 13 may be formed separately from the ferrule 2 and secured therein in any known or suitable manner, or either said washer 4 or disk 13 may be formed integrally, by casting or otherwise, with said ferrule. When the outer disk 13 is formed integrally with the ferrule, it will be necessary to construct the hook-pin 8 and the hook 9 separately from each other, so that said pin, with the locking-pin 11, connected therewith, may be slid up through the base of the ferrule, the hook in such case being secured to the pin 8 in any suitable manner, as by riveting or otherwise.

Normally when the hook 9 is closed the square hook-locking pin 11 is seated within the square groove 15 in the disk 13, and is held therein, so as to lock the hook-pin 8 and hook 9 and prevent the accidental turning of either, by the frictional contact with said pin 11 of the outer end of the spiral spring 6. When it is desired to open the hook to either place in or remove from position a trace or tug, as 3, an inward pressure is by hand exerted upon the hook 9. This forces the hook-pin 8 inward within the central bores of, respectively, the disk 13 and washer 4 and releases the square locking-pin 11 from engagement with the square groove 15 in the disk 13. The hook 9 is then turned one-quarter around, during which movement the square pin 11 rides over the curved inner face 14 of the disk 13 until it reaches the curved groove 16 in said disk, when the spiral spring forces said square pin within said curved groove, where it remains, holding the hook open until the tug or trace is either placed over the hook and in engagement with the hook-pin 8, as shown, or until said tug or trace is removed therefrom, as desired. Then to close the hook all that is necessary is to re-turn the hook without endwise pressure thereon. As said hook is thus re-turned, the square pin 11 is drawn out of the curved groove 16, in which it is seated, it freely moving at this time by reason of the curvatures of said groove and of the inner face of the disk 13. On reaching the square groove 15 the spring 6 forces said square pin therein and maintains it in position therein, thereby locking the hook in closed position and preventing the rotation or partial rotation of either the hook or its carrying-pin.

While this whiffletree-hook will be seen to be extremely simple in construction it also possesses the advantages of being very durable, affording secure locking of the hook when in use, and preventing accidental displacement of the tug or trace. The operative parts being inclosed in the ferrule are shielded from contact with extraneous matters, as snow, dirt, ice, and such like, therefore by such inclosure rendering the device at all times and under all circumstances in condition for use.

Having thus described my invention, what I claim is—

1. A whiffletree-hook consisting of a ferrule having a lateral extension, a hook-carrying pin having longitudinal and rotary bearing within said ferrule, a locking-pin seated within and extending transversely through said hook-carrying pin and having lock-bearing within said ferrule, and a hook extending transversely across the outer end of said hook-carrying pin and curving rearwardly and transversely to engage with the lateral extension of the ferrule, substantially as and for the purpose set forth.

2. In a whiffletree-hook, a ferrule adapted to be seated on the end of a whiffletree and having an external laterally and forwardly extending horn, a centrally-bored washer located at the base of the chambered portion of said ferrule, a centrally-bored disk located in the outer end, or mouth, of and closing the mouth of said ferrule and having in its inner face a square, or angular transverse groove, and also a curved transverse groove and, mediately of said grooves, raised curved faces, a spring seated between said washer and disk, a hook, a hook-carrying pin seated within the central bores of said washer and disk, respectively, and a square pin carried by and extending transversely through said hook-pin to engage said grooved disk, substantially as and for the purpose set forth.

In testimony whereof I affix my signature in presence of two witnesses.

MARK M. SANDERSON.

Witnesses:
F. B. WHITE,
ALBERT L. QUINN.